March 6, 1928.
R. E. BAUS
1,661,459
METHOD OF LOADING AUTOMOBILE BODIES IN FREIGHT CARS
Original Filed May 2, 1925   3 Sheets-Sheet 1
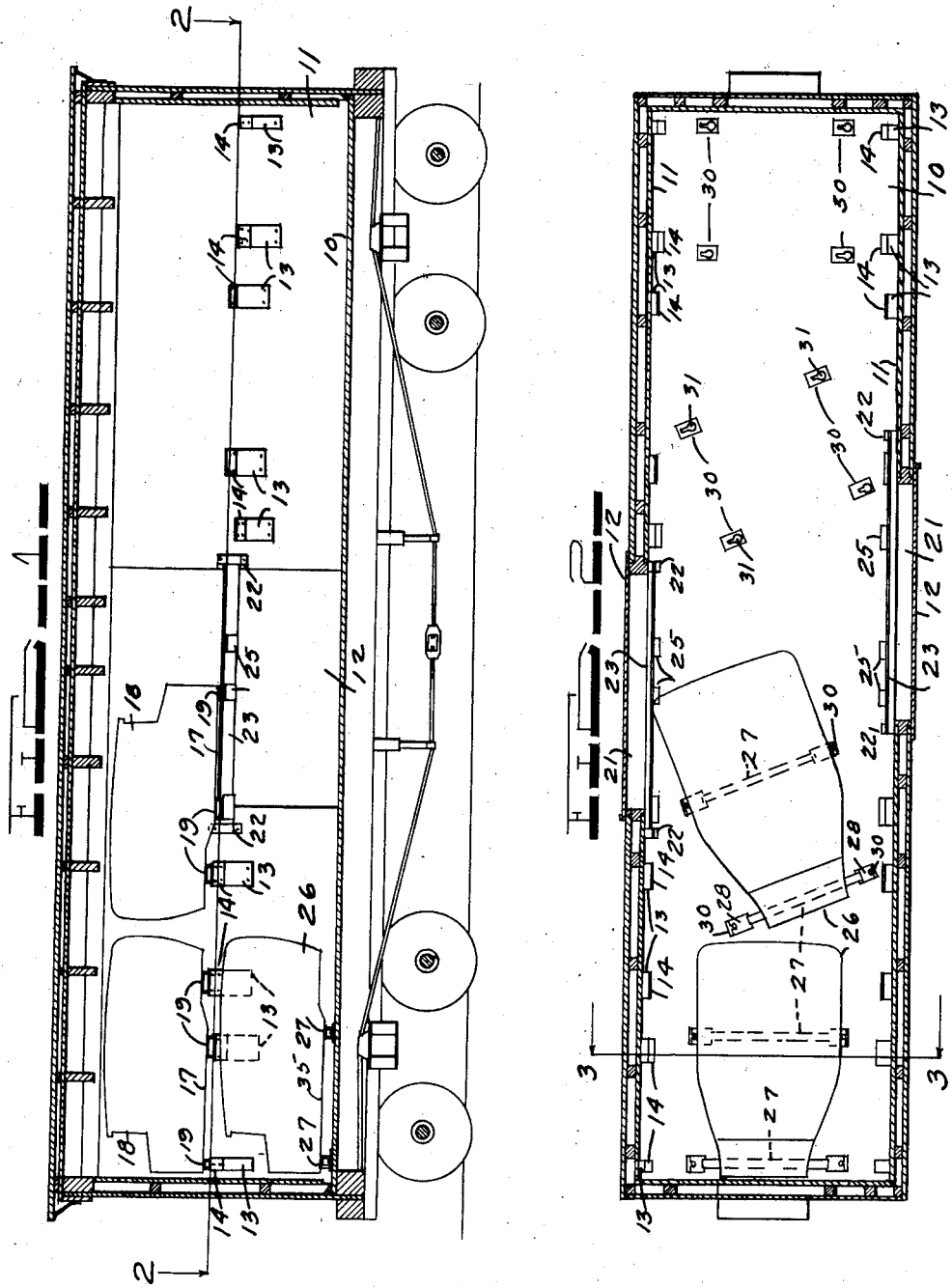
INVENTOR
RICHARD E. BAUS
BY
ATTORNEY March 6, 1928.
R. E. BAUS
1,661,459
METHOD OF LOADING AUTOMOBILE BODIES IN FREIGHT CARS
Original Filed May 2, 1925    3 Sheets-Sheet 2
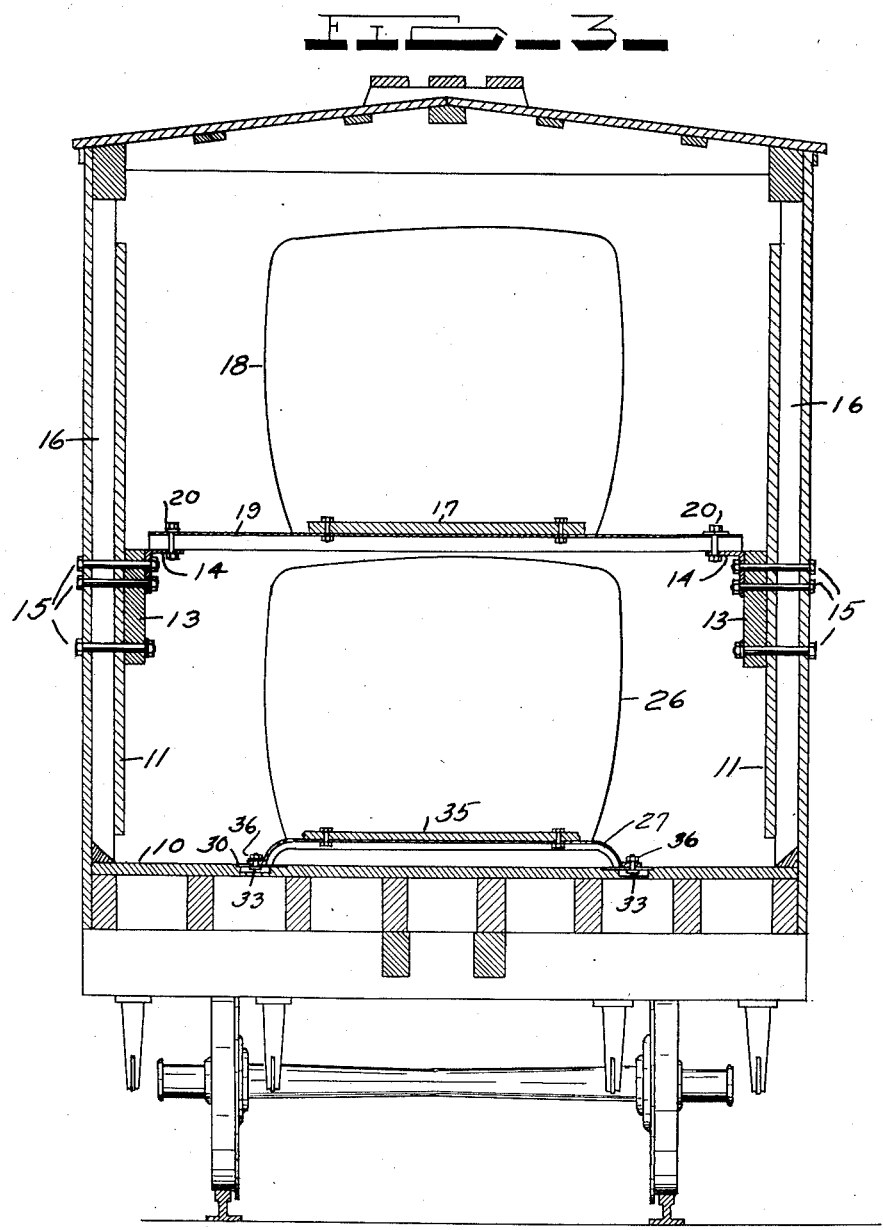
INVENTOR
RICHARD E. BAUS
BY
P. W. Pomeroy
ATTORNEY March 6, 1928.
R. E. BAUS
1,661,459
METHOD OF LOADING AUTOMOBILE BODIES IN FREIGHT CARS
Original Filed May 2, 1925      3 Sheets-Sheet 3
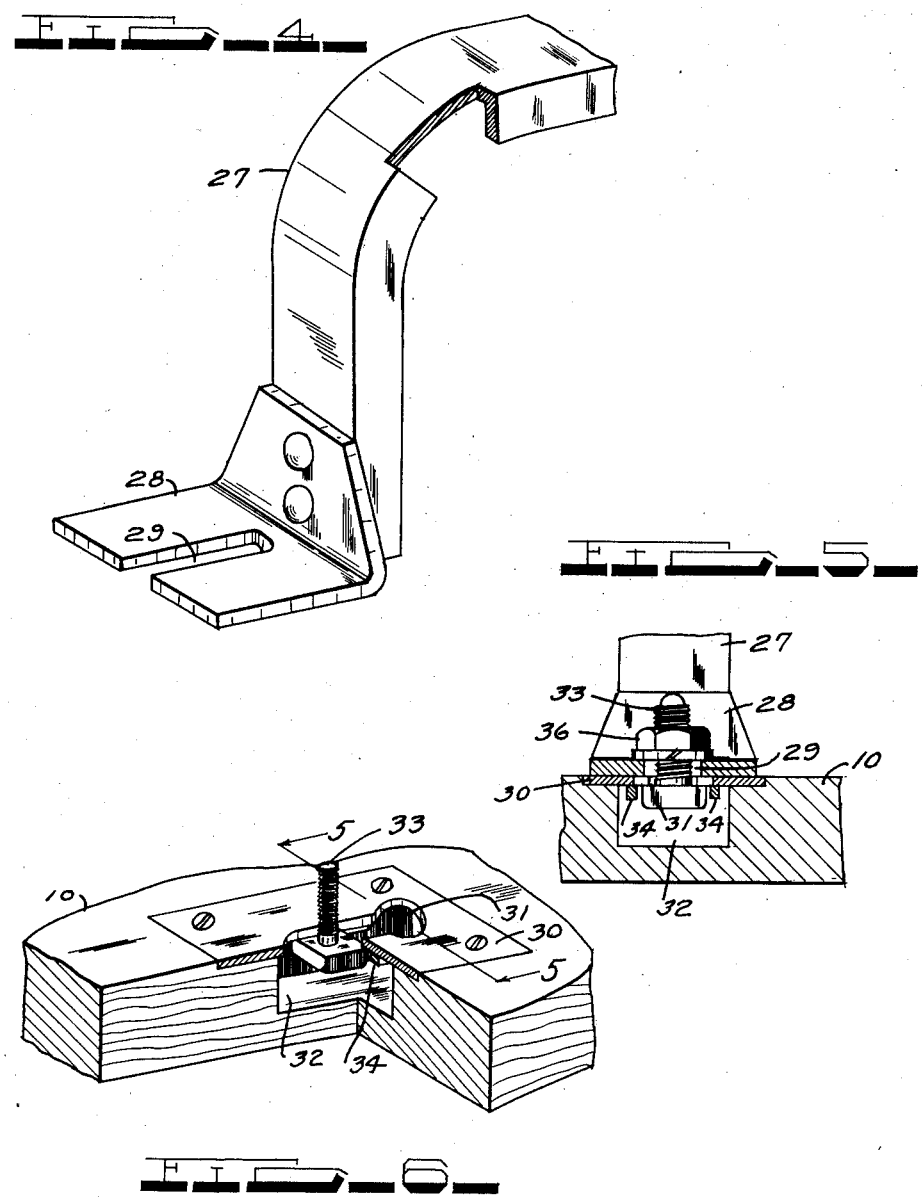
INVENTOR
RICHARD E. BAUS
BY
ATTORNEY Patented Mar. 6, 1928.

1,661,459

UNITED STATES PATENT OFFICE.

RICHARD E. BAUS, OF DETROIT, MICHIGAN, ASSIGNOR TO THE STUDEBAKER CORPORATION, OF SOUTH BEND, INDIANA, A CORPORATION OF NEW JERSEY.

METHOD OF LOADING AUTOMOBILE BODIES IN FREIGHT CARS.

Original application filed May 2, 1925, Serial No. 27,518. Divided and this application filed August 26, 1926. Serial No. 131,673.

This invention relates to the shipping of automobile bodies in freight cars, and is a division of my copending application, Serial Number 27,518, filed May 2, 1925, and has for its object the providing of a simple, economical and novel means whereby a relatively large number of such bodies may be shipped in a single car and may be placed therein and removed therefrom with relative ease and speed.

Another object is to provide a means for double decking automobile bodies in freight cars for shipment in which the upper bodies are supported from the sides of the car and the lower bodies are supported on the floor of the car in a new and novel manner.

Another object is to provide cross members secured to the sills of the bodies and slotted plates on the floor of the freight car whereby bolts may be removably positioned in said slotted plates to engage and secure said cross members thereto.

A further object is to provide cross members secured to the sills of an automobile body, which cross members are bow-shaped so as to allow a loading truck to pass therebeneath, and slotted plates secured to the freight car floor at an angle to the length of the car, whereby a body may be moved on a truck through the door of the freight car to a position over said slotted plates, the truck dropped and removed, and bolts passed through said slotted plates and the ends of said cross members to secure said body as a unit to said floor.

The above being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, and in which like numerals refer to like parts throughout the several different views, Figure 1 is a vertical section taken longitudinally of a freight car just inside the near side of the same, showing in a more or less diagrammatic fashion automobile bodies therein supported and secured in accordance with the present invention.

Figure 2 is a horizontal sectional view of the freight car taken on the line 2—2 of Figure 1, a body being shown in a position adjacent the freight car door which was not shown in Figure 1 because it would tend to confuse that drawing.

Figure 3 is an enlarged vertical sectional view taken on the line 3—3 of Figure 2.

Figure 4 is a perspective view of one end of one of the supporting cross members for the lower tier of bodies.

Figure 5 is a fragmentary vertical sectional view taken on the line 5—5 of Figure 6 and transversely through the large end of the slot in the slotted plate used to secure the cross members of the lower tier of bodies to the floor.

Figure 6 is a fragmentary perspective view of one of the slotted plates used to secure the cross members of the lower tier of bodies to the floor of the freight car, shown in position on the floor of the freight car.

In the drawings is illustrated a freight or box car having a floor 10, sides 11 and doors 12, in which the present invention is employed to ship automobile bodies. As best shown in Figure 3, brackets comprising a block 13 and an angle member 14 are secured to the sides 11 by means of bolts 15 which extend through the block 13 and side 11, the upper bolts 15 also passing through the depending leg of the angle member 14 thereby to secure it in position with the block 13. The horizontal leg of the angle member 14 provides a horizontal supporting and attaching flange as will presently be described. Although the block 13 may be extended down into contact with the floor 10, in most cases I have found this unnecessary, particularly where the body is not extremely heavy and the brackets are placed in line with the vertically extending studs 16. These brackets are placed in line with each other on the opposite sides of the inside of the car and with their upper surfaces at a height above the floor greater than the height of the bodies to be shipped therebelow. To the under side of the sill or sill cross members 17 (Figure 3) of each body 18 which is to be supported on these brackets are secured two or more cross members 19, three of which are employed for each body in the accompanying drawings. These cross members are of channel iron with the open side of the channel facing downwardly, and each is of sufficient length to substantially span the width of the inside of the freight car and rest against the upper horizontal face of the angle member 14, and they are spaced along the under side of the body in accordance with the spacing of the brackets on the side of the car so that each cross member will engage its respective brackets.

In practice these cross members 19 are bolted to the under side of the body 18 as shown, being so spaced that the bolts pass through the openings provided for subsequently bolting the body 18 to its chassis. The body 18 and cross members 19 are placed as a unit on a suitable elevating platform, the platform is rolled into the freight car, the platfrom is raised until the body and cross members are above the upper face of the angle member 14, the platform is manipulated to bring the cross members 19 directly above the angle members, 14, the platform is lowered until the ends of the cross members 19 rest on the angle members 14, and then bolts 20 are passed through the overlapping portion of the cross members 19 and angle members 14, after which the platform is removed. To unload, these operations are reversed as will be plainly apparent. As will also be apparent, such loading of a freight car is begun at a point farthest from the door after which other bodies are loaded in a similar manner nearer the door.

Inasmuch as there is no side wall in the door openings 21 to support the brackets, I provide a strap member 22 secured to the inside face of the side 11 on each side of the door openings 21 at a height corresponding to the height of the blocks 13. Removably supported by each pair of strap members 22 on the same side of the car is a channel member 23 which extends between and is received in the strap members 22, and when in operation is held from accidental disengagement therewith by means of a bolt or pin which passes through one end of the channel member 23 and its corresponding strap member 22. Suitable angle members 25, corresponding to the angle members 14, are secured to the channel member 23 in proper spaced relation, the angle members 25 serving the same purpose as the angle members 14 previously described. After the bodies 18 have been loaded up to the point of the door opening 21, the channel members 23 are inserted in the strap members 22, the pin is dropped in place, and a body 18 is loaded as previously described.

The lower tier or deck of bodies, which for the sake of clearness is indicated as 26, is loaded in somewhat the same manner but the method of supporting them is different than that for the upper deck. In the lower deck two cross members 27 of a different shape and shorter than the cross members 19 are employed for each body 26 and are secured directly to the floor 10. These cross members 27 are of channel section and the ends are bent downwardly to form bow-shaped ends to elevate the body 26 from the floor 10, and to the down-turned ends are secured an angle-shaped foot 28 having a horizontal face provided with a slot 29 (Figure 4). Set into the floor 10 in a position to match the respective feet 28 of the cross members 27 are metal plates 30, each of which is provided with a centrally located keyhole-shaped slot 31 (Figures 2, 5 and 6) beneath which a recess 32 is provided in the floor 10. The enlarged part of the slot 31 is of a size sufficient to allow the head of a bolt 33 to pass therethrough into the recess 32, after which the bolt 33 may be slid up into the narrow portion of the slot to thereby prevent it from being withdrawn from the slot. Guides such as 34 are secured to the under side of each plate 30 adjacent the narrow portion of the slot 31 to engage the head of the bolt 33 and hold the same against turning. In practice, the cross members 27 are bolted to the sill or sill cross member 35 of a body 26 as previously described in connection with the bodies in the upper tier or deck. A low-lift truck is positioned beneath the cross members 27, and the body 26 and cross members are raised as a unit, rolled into the freight car, dropped in position over the plates 30, bolts 33 inserted into the slots 31 and moved into the narrow portion thereof, being at the same time slipped into the slots 29 in the feet 28, and nuts 36 are threaded home on the bolts 33, thereby securing the feet 28 to the floor 10, after which the truck is removed.

In order to facilitate the loading and unloading of the bodies 26 as much as possible, I prefer to place those bodies immediately adjacent the doors 12 at an angle to the length of the freight car as shown in Figure 2, thereby requiring the least time possible in manipulating the loading truck to place the bodies in securing position or to remove them therefrom.

While the above described method and apparatus will be found to be of the greatest value where the same cars are used continuously for the shipping of such bodies, in which case the brackets on the walls 11 and the plates 30 may be left in position at all times, nevertheless it will be found that even where the freight cars are not so used continuously, and consequently where the brackets must be removed after each shipment, particularly if the feet 28 are replaced by ones of a different type that may be nailed or spiked to the floor 10, a substantial saving in time and labor results as well as a substantial reduction in the amount of material necessary to secure the bodies in place.

Formal changes may be made in the specific embodiment of the invention described without departing from the spirit and substance of the broad invention, the scope of which is commensurate with the appended claims.

What I claim is:—

1. The method of loading an automobile body in a freight car for shipment, comprising first securing to the under side of said body a plurality of cross members having downwardly extending end portions, placing said body and said cross members in said car as a unit, and thereafter removably securing the ends of said cross members to the floor of said car.

2. The method of loading an automobile body in a freight car for shipment, comprising securing to the under side of said body a plurality of cross members, said cross members being U shaped and secured to said body in inverted position, the height of said U being sufficient to allow a lifting truck to pass therebeneath, placing said body and said cross members in said car as a unit, and thereafter securing said cross members to the floor of said car.

3. The method of loading automobile bodies in freight cars for shipment, comprising securing to the under side of each of said bodies a plurality of inverted U shaped supporting members of a height sufficient to receive a lifting truck therebelow, placing said bodies and said supporting members in said freight car as a unit, and securing said supporting members to the floor of said freight car, said bodies adjacent the door of said freight car being placed at an angle to the length of said freight car whereby to facilitate the introduction and removal thereof.

4. The method of loading an automobile body in a freight car for shipment, comprising securing supporting members to said body and moving said body with said supporting members as a unit into said car and securing the ends of said members to the floor of said car, the ends of said members being downwardly bent to form feet.

5. The method of loading an automobile body in a freight car for shipment, comprising securing a plurality of U-shaped supporting members to the under side of said body, moving said body and said supporting members into said car as a unit, and thereafter securing the ends of said U-shaped supporting members to the floor of said car, said supporting members being of a height sufficient to allow a lifting truck to be inserted under said body when supported thereby.

6. The method of loading an automobile body in a freight car for shipment, comprising securing to the under side of said body a plurality of cross members having depending legs and slots in the feet of said legs, providing slotted bolt-receiving plates in the floor of said car, placing said body and said cross members in said car as a unit with said feet in matching relation with said plates, and thereafter bolting said feet to said plates.

7. Means for securing an automobile body to a floor, comprising a cross member secured to said body and having downwardly extending ends, slotted plates secured to said floor, and means for securing the ends of said cross member to said plates.

8. Means for securing an automobile body to a floor, comprising a U shaped cross member having its ends projecting downwardly secured to said body, plates having slots therein secured to said floor, means extending through said slots and nonrotatable therein for securing the ends of said cross member to said plates.

9. Means for securing an automobile body to a floor, comprising a U shaped cross member having its ends projecting downwardly secured to said body, horizontally extending plates having slots therein at the ends of said cross member, plates secured to said floor having slots therein positioned in matching relation with the slots in first-named plates, and means extending through the slots in said first and second-named plates for securing said cross member to said second-named plates.

10. The method of loading an automobile body in a freight car for shipment, comprising detachably securing to said body a plurality of cross members, the ends of said cross members being shaped to contact with the floor of the freight car, placing said body and said cross members in said car as a unit, and thereafter securing said cross members to the floor of said car.

11. The method of loading an automobile body in a freight car for shipment, comprising securing supporting members to said body, placing said body and said members as a unit in said car, and thereafter securing said members to said car, the ends of said members being slotted and each being secured to a slotted supporting member carried by said car.

Signed by me at Detroit, Michigan, U. S. A., this 17th day of August, 1926.

RICHARD E. BAUS.